United States Patent [19]

Bishop

[11] Patent Number: 4,784,869

[45] Date of Patent: Nov. 15, 1988

[54] METHOD OF BROILING FOOD PATTIES ON BOTH SIDES USING CONVEYORS

[76] Inventor: Gerald A. Bishop, 24601 Voorhess Dr., Los Altos Hills, Calif. 94022

[21] Appl. No.: 30,047

[22] Filed: Mar. 24, 1987

Related U.S. Application Data

[62] Division of Ser. No. 784,267, Oct. 4, 1985, Pat. No. 4,667,589.

[51] Int. Cl.$^4$ ............................................. A23L 1/01
[52] U.S. Cl. ............................................. 426/523
[58] Field of Search ............... 426/523, 657; 99/349, 99/386, 443 C, 395, 427

[56] References Cited

U.S. PATENT DOCUMENTS

| | | | |
|---|---|---|---|
| 2,529,253 | 11/1950 | Hoffman | 99/395 X |
| 3,065,079 | 11/1962 | Elliott | 99/349 X |
| 3,257,935 | 6/1966 | Temperato | 99/395 X |
| 3,371,595 | 3/1968 | Peters | 99/386 X |
| 3,456,578 | 7/1969 | Pinsly | 99/386 X |
| 3,659,517 | 5/1972 | Holen | 99/386 X |
| 3,823,660 | 7/1974 | Nerthling | 99/386 |
| 4,077,311 | 3/1978 | Womack | 99/386 X |
| 4,213,380 | 7/1980 | Kahn | 99/395 X |

Primary Examiner—Steve Alvo
Attorney, Agent, or Firm—Limbach, Limbach & Sutton

[57] ABSTRACT

A double pass, double conveyor broiler apparatus and method for efficiently cooking large numbers of relatively large hamburger patties is disclosed. The apparatus includes two burners and two conveyors, with one conveyor conveying patties past one burner for cooking one side of the patties and flipping over the partially cooked patties, and with the other conveyor conveying the patties past the other burner for cooking the other side. The patties on the second conveyor are sandwiched between the belts of the two conveyors, which flattens the patties to counteract the tendency of large patties to swell at the center and curl at the edges.

3 Claims, 3 Drawing Sheets

U.S. Patent    Nov. 15, 1988    Sheet 1 of 3    4,784,869
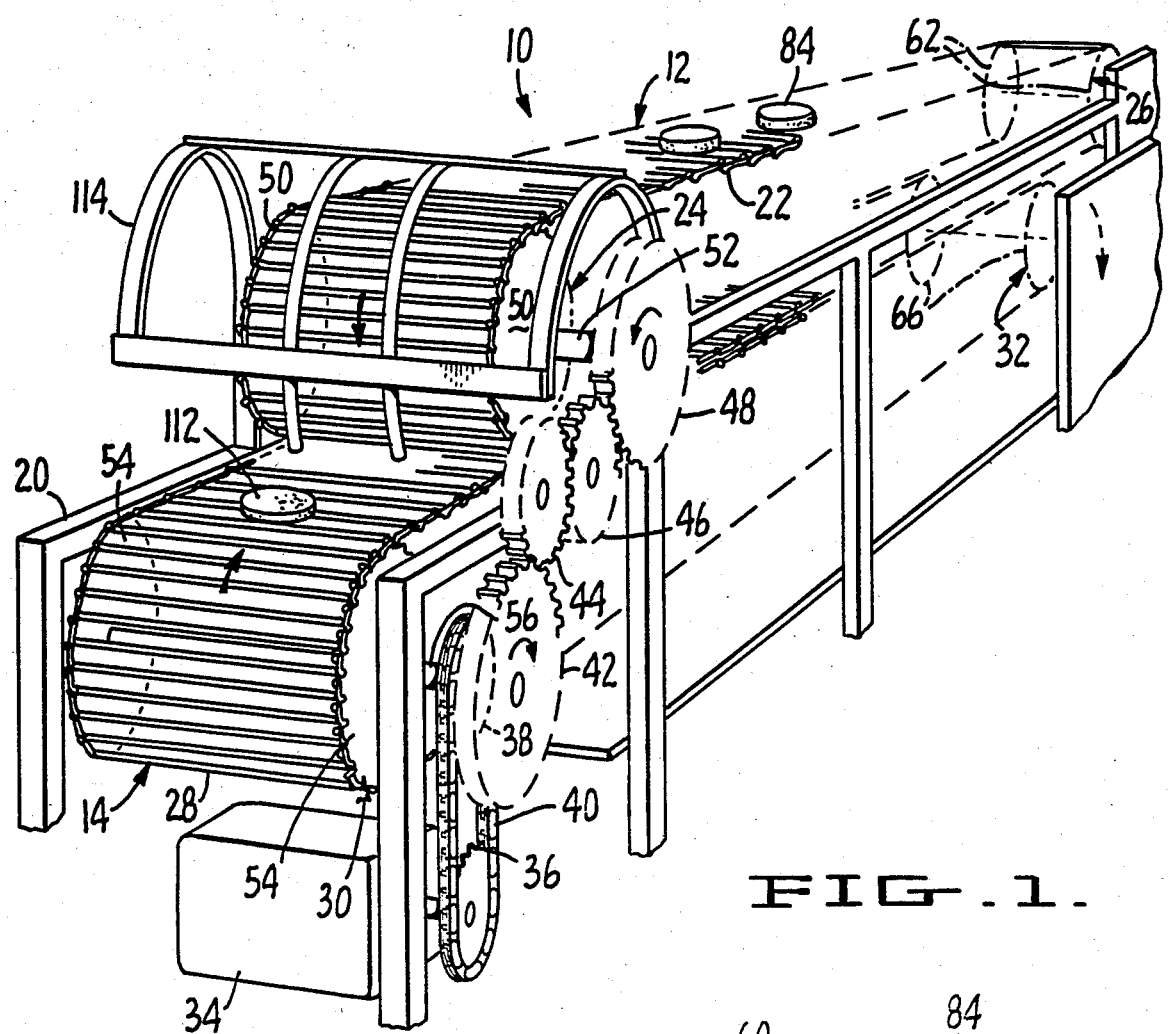
FIG. 1.
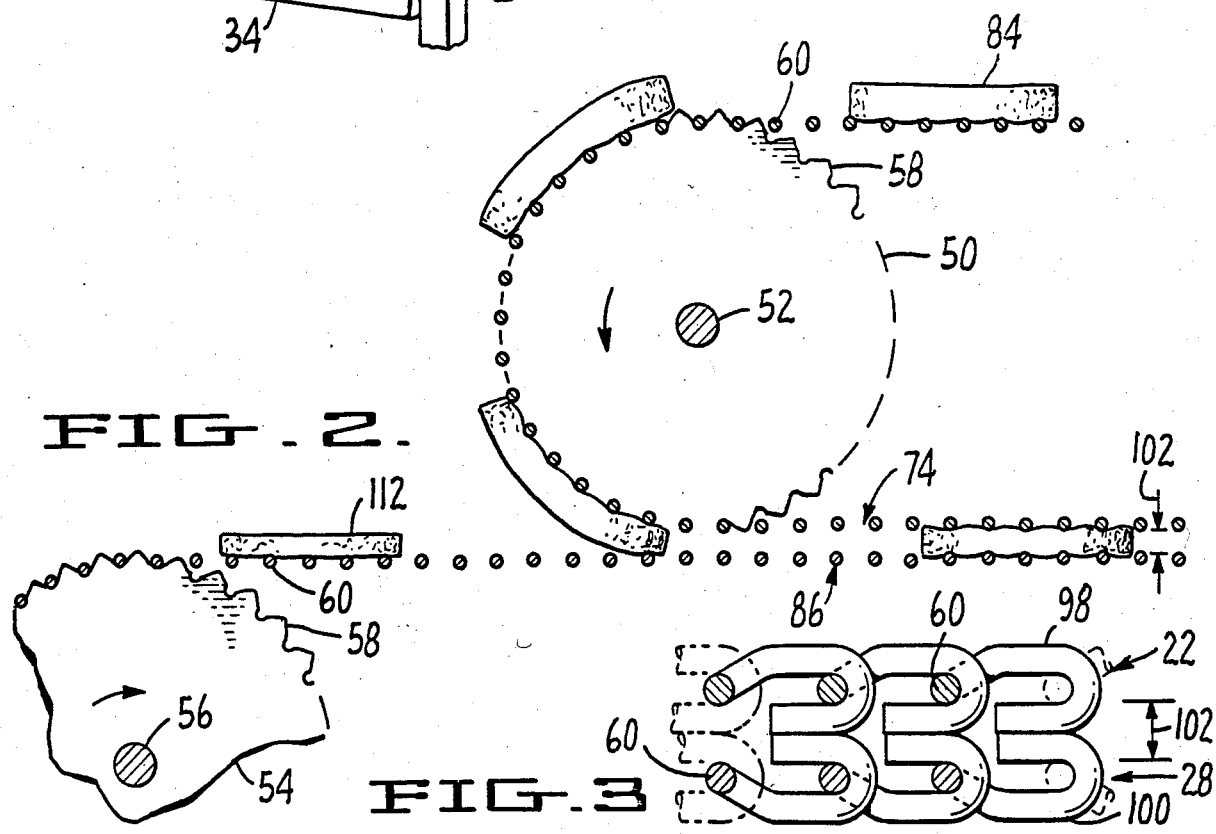
FIG. 2.
FIG. 3

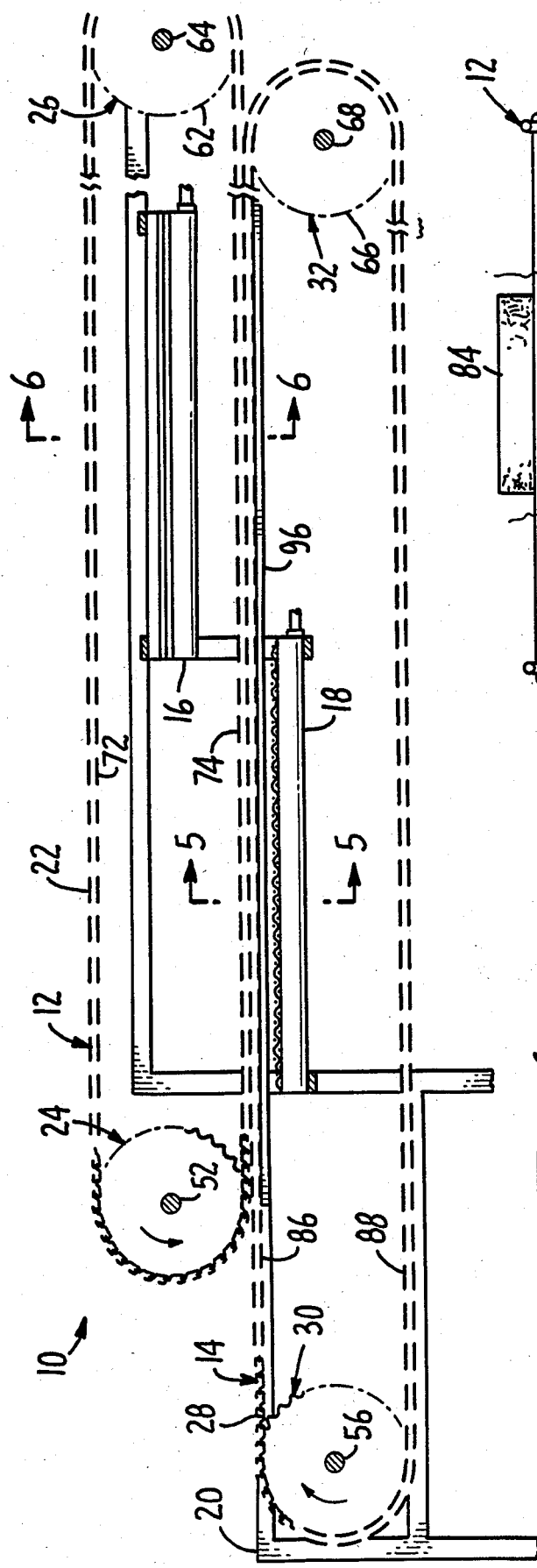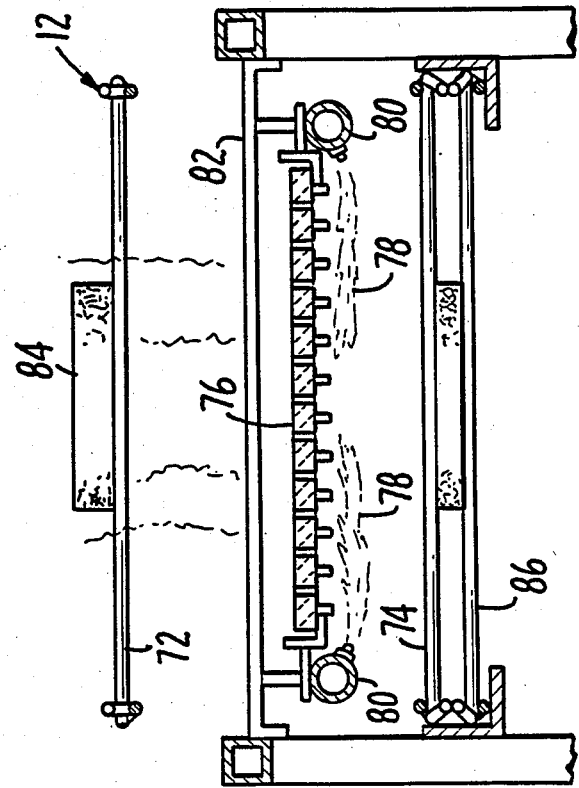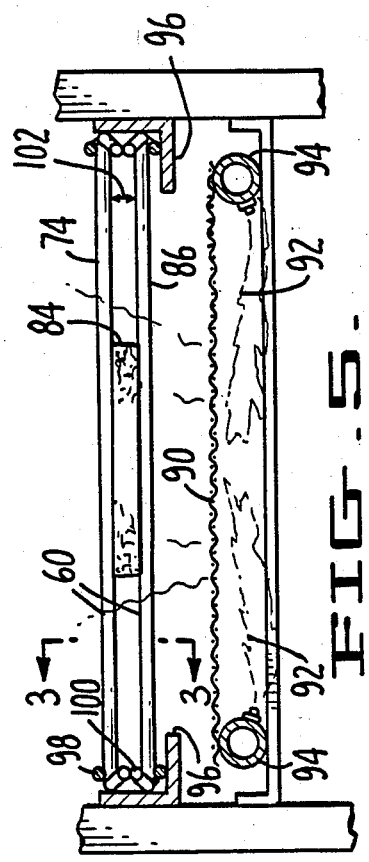

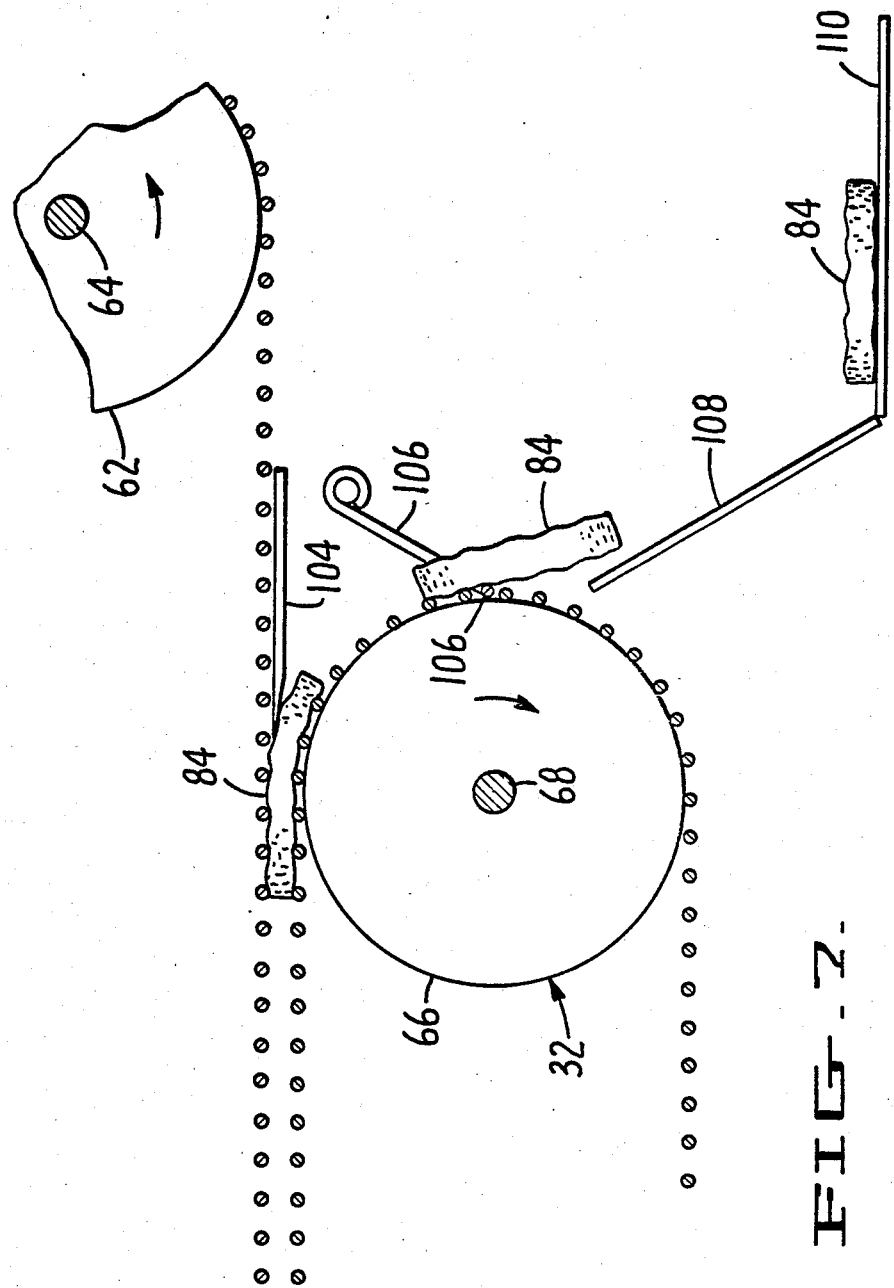

METHOD OF BROILING FOOD PATTIES ON BOTH SIDES USING CONVEYORS

This is a divisional of Application Ser. No. 784,267, filed 10/4/85, now U.S. Pat. No. 4,667,589.

BACKGROUND OF THE INVENTION

1. Field of the Invention

This invention relates generally to a broiler for cooking hamburger patties, and relates more particularly to a double pass, double conveyor broiler apparatus and method for cooking relatively larger hamburger patties.

2. Description of the Relevant Art

Broilers capable of efficiently cooking large numbers of hamburger patties weighing four ounces or less are in common use. Such broilers typically include a belt conveyor and two burner units, with one burner placed above and the other burner placed below the conveyor. In operation, uncooked meat patties are placed on the conveyor, which transports the patties past the two burners.

Such single conveyor broilers perform adequately when cooking relatively small patties weighing four ounces or less, but problems arise when attempting to cook relatively large patties weighing perhaps six or eight ounces. When large patties are cooked, they tend to shrink in diameter and bulge in the center. As a result, the center of large patties cooked on conventional broilers are underdone, even raw in the center. Also, the overhead burner causes the edges of the large patties to curl upward, which traps grease in the center of the patties and overcooks the edges. Thus, such conventional broilers are not able to achieve a quality cooking job on relatively large hamburger patties.

SUMMARY OF THE INVENTION

In accordance with the illustrated preferred embodiment, the present invention provides a double pass, double conveyor broiler apparatus and method for efficiently cooking large numbers of relatively large hamburger patties. More particularly, the apparatus includes two burners and two conveyors, with a first conveyor acting to convey patties placed thereupon past one burner for cooking one side of the patties and for flipping over the partially cooked patties, and with a second conveyor acting to receive the partially cooked patties from the first conveyor and to convey the patties past the other burner for cooking the other side of the patties.

The method of broiling hamburger patties includes the steps of conveying the patties on the first conveyor past the first burner to cook one side of the patties, flipping the partially cooked patties over and transferring them to the second conveyor, which is positioned below the first conveyor, and conveying the patties past the second burner to cook the other side of the patties.

In the preferred embodiment of the present invention, the upper run (top level) of the second conveyor is positioned immediately below the lower run (bottom level) of the first conveyor, and the two conveyors travel at the same speed. This positioning is advantageous because the patties on the second conveyor are thus sandwiched between the belts of the two conveyors, which flattens the patties to a fairly uniform thickness to counteract the tendency of the patties to swell at the center and curl at the edges.

The first burner is positioned immediately below the upper run of the first conveyor and cooks the underside of the patties on the first conveyor, which tends to draw the patties toward the belt. The partially cooked patties adhere to the belt of the first conveyor as it rounds the end pulley, whereupon the patties are flipped and transferred to the second conveyor. The second burner is positioned immediately below the upper run of the second conveyor, and cooks the other side of the patties. Some additional cooking of the patties is accomplished as the second conveyor conveys the patties past and below the first burner.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is an overall perspective view of a double pass, double conveyor broiler according to the present invention.

FIG. 2 is a side elevation detail view of a transfer region of the broiler of FIG. 1.

FIG. 3 is a side elevation sectional view of two metal-link belts utilized in the conveyors of the broiler of FIG. 1, and is taken along section line 3—3 of FIG. 5.

FIG. 4 is a side elevation view of the broiler of FIG. 1.

FIG. 5 is an end elevation sectional view of a second burner of the broiler of FIG. 1, and is taken along section line 5—5 of FIG. 4.

FIG. 6 is an end elevation sectional view of a first burner of the broiler of FIG. 1, and is taken along section line 6—6 of FIG. 4.

FIG. 7 is a side elevation detail view of an unload region of the broiler of FIG. 1.

DETAILED DESCRIPTION OF THE PREFERRED EMBODIMENT

FIGS. 1 through 7 of the drawings depict the preferred embodiment of the present invention for purposes of illustration only. One skilled in the art will readily recognize from the following discussion that alternative embodiments of the structures and methods illustrated herein may be employed without departing from the principles of the invention described herein.

As best shown in FIGS. 1 and 4, the preferred embodiment of the present invention is a double pass, double conveyor broiler 10 that includes first and second belt conveyors 12 and 14, respectively, and first and second burners 16 and 18, respectively. The conveyors and the burners are supported by a support frame 20, which also provides an attachment point for side covers (not shown) that cover the sides of the broiler 10 during operation.

The two conveyors 12 and 14 are positioned with the second conveyor 14 located directly below the first conveyor 12. Each of the conveyors 12 and 14 includes an endless metal-link belt disposed between two end pulleys, one of which is driven to rotate the belt. The first conveyor 12 includes a belt 22 disposed between pulleys 24 and 26, while the second conveyor 14 includes a belt 28 disposed between pulleys 30 and 32.

The pulleys 24 and 30 are driven in rotation at the same speed but in opposite directions by an electric motor 34 with a gear reduction drive and a chain and gear drive mechanism. The motor 34 drives a sprocket 36, which in turn drives sprocket 38 that is coupled to sprocket 36 by a chain 40. Sprocket 38 is coupled to rotate both pulley 30 and a gear 42 in a clockwise direction, as viewed in FIGS. 1 and 4. Gear 42 drives transfer gears 44 and 46, which in turn drives gear 48 and coupled pulley 24 in a counterclockwise direction.

The pulleys 24, 26, 30, and 32 of the conveyors 12 and 14 are mounted to the frame 20 with bearings (not shown), which allow the pulleys to freely rotate. Pulley 24 includes two sprockets 50 joined by a shaft 52 that is secured to the drive gear 48. Similarly, pulley 30 includes two sprockets 54 joined by a shaft 56 that is secured to the drive gear 42. As shown in FIG. 2, the teeth 58 of the sprockets 50 and 54 engage the cross links 60 of the belts 22 and 28 near the lateral edges of the belts. The belts 22 and 28 of the conveyors 12 and 14 are thus driven by the rotating sprockets 50 and 54.

Pulley 26 at the other end of the first conveyor 12 includes two disks 62 that are laterally spaced apart by and coupled to a rotatably supported shaft 64 (shown in FIGS. 4 and 7). Similarly, pulley 32 of the second conveyor 14 includes two disks 66 that are laterally spaced apart by and coupled to a rotatably supported shaft 68 (shown in FIGS. 4 and 7). The outer periphery of the disks 62 and 66 contacts the belts 22 and 28 near the lateral edges of the belts. The mounting attachments of the shafts 64 and 68 to the frame 20 are adjustable so that the pulleys 26 and 32 can be moved longitudinally to adjust the tension on the belts 22 and 28.

The construction of the belts 22 and 28 is illustrated in FIG. 3. Each link in each belt is formed from a metal rod, with the center of each rod forming the cross link 60, and the ends of each rod wrapping around the neighboring links.

As shown in FIGS. 4 and 6, the first burner 16 is positioned between the upper and lower runs 72 and 74 of the first conveyor 12, near the pulley 26 end of the first conveyor. The first burner 16 includes perforated fire brick 76 that is heated from below by a flame 78 emitted by two longitudinally disposed burner manifolds 80. The fire brick 76 heats a metal plate 82 positioned above the fire brick, which in turn supplies heat to cook the underside of meat patties 84 placed on the upper run of the first conveyor 12.

As shown in FIGS. 4 and 5, the second burner 18 is positioned between the upper and lower runs 86 and 88 of the second conveyor 14, and between the first burner 16 and the drive pulley 24 of the first conveyor 12. The second burner 18 includes a metal screen 90 that is heated from below by a flame 92 emitted by two longitudinally disposed burner manifolds 94. The flame 92 and the screen 90 supplies heat to cook the underside of patties 84 placed on the upper run 86 of the second conveyor 14. The metal screen 90 is preferably formed of "ICONEL" (nickel-chromium-iron alloy) in order to withstand the heat from the flame 92.

The upper run 86 of the second conveyor 14 is positioned just below and parallel to the lower run 74 of the first conveyor 12. The lower run 74 of the first conveyor 12 and the upper run 86 of the second conveyor 14 are driven at the same speed and in the same direction. The lower run 74 of the first belt 22 of the first conveyor 12 is supported by the second belt 28 of the second conveyor 14, which is supported in turn by angle brackets 96 that extend longitudinally along the length of the second conveyor (see FIGS. 4 and 5). The side links 98 of the first belt 22 rest on the side links 100 of the second belt 28 to define a space 102 between the cross links 60 of the two belts (see FIGS. 3 and 5).

In operation, uncooked patties 84 are placed on the upper run 72 of the first conveyor 12 near pulley 26. The patties are conveyed by the first conveyor past and above the first burner 16, which cooks the underside of the patties. As the patties pass above the second burner 18, some additional cooking is achieved from the rising heat from the second burner. The application of heat to the patties from below the belt 22 causes the patties to adhere to the belt 22. As the belt 22 rounds the drive pulley 24, the patties are automatically flipped and transferred to the upper run 86 of the second conveyor 14, as best shown in FIG. 2.

The patties on the second conveyor remain in contact with the first belt 22, and are confined within the space 102 between the two belts 22 and 28. This confinement flattens the patties 84 to a fairly uniform thickness to counteract the tendency of the patties to swell at the center and curl at the edges. Some squeezing of the patties is also accomplished by the two belts for the purpose of removing excess fat. The second conveyor 14 conveys the patties 84 past and above the second burner 18 for cooking the other side of the patties. The second conveyor 14 also conveys the patties 84 past and under the first burner 16, which additionally cooks the now upper side of the patties.

By the time the patties 84 reach the end pulley 32 of the second conveyor 14, the cooking operation has been completed. As shown in FIG. 7, a knife 104 is positioned immediately below the underside of the lower run 72 of the first conveyor 12 and above pulley 32 in order to separate any adhering patties from the first belt 22. A trip wire 106, which is spring biased toward the pulley 32, separates any adhering patties from the second belt 28. Once the patties are free from the belts, they slide down an incline 108 to a tray 110.

In summary, then, the cooking process of the broiler 10 includes the steps of first applying gradual heat to unconstrained patties 84 on the first conveyor 12, then flipping the partially cooked patties over and onto the second conveyor 14, then applying heat to cook the other side of the patties while they are sandwiched between the two belts 22 and 28. The degree of cooking is adjusted by adjusting the speed of the drive motor 34.

Small patties and patties to be cooked to a rare degree of completion can also be accommodated with the broiler 10. Such patties 112 are placed on the second conveyor 14, upstream of the drive pulley 24 of the first conveyor 12, as shown in FIGS. 1 and 2. The patties 112 are spaced so as not to interfere with patties 84 being transferred from the first conveyor 12. A safety guard 114 protects against operators' hands from being drawn into the conveyors 12 and 14 while loading the patties 112. The patties 112 are conveyed by the second conveyor 14 past and over the second burner 18 and past and below the first burner 16. This reduced cooking time and application of heat is sufficient to cook small and thin patties to a medium degree of completion, and to cook large patties to a rare degree of completion.

From the above description, it will be apparent that the invention disclosed herein provides a novel and advantageous apparatus and method for efficiently cooking large numbers of relatively large hamburger patties in a double pass, double conveyor broiler. The foregoing discussion discloses and describes merely exemplary methods and embodiments of the present invention. One skilled in the art will readily recognize from such discussion that various changes, modifications and variations may be made therein without departing from the spirit and scope of the invention described in the following claims. Accordingly, the disclosure of the present invention is intended to be illustrative, but not limiting, of the scope of the invention, which is set forth in the following claims.

What is claimed is:

1. A method of broiling food patties, comprising the steps of:
    conveying the food patties on a first conveyor above and past a first burner to cook one side of the food patties, wherein said first conveyor includes an endless metal-link belt disposed between two rotating pulleys;
    flipping the partially cooked food patties over and transferring the partially cooked food patties to a second conveyor disposed below said first conveyor, wherein said second conveyor includes an endless metal-link belt disposed between two rotating pulleys, and wherein said partially cooked food patties are flipped over and transferred to said second conveyor as said belt of said first conveyor rounds the pulley at the end of said first conveyor;
    confining the food patties between a lower run of said first conveyor and an upper run of said second conveyor, wherein the belts of said first and second conveyors are driven at the same linear speed in opposite rotational directions; and
    conveying the food patties past a second burner located immediately below the upper run of said second conveyor to cook the other side of the food patties.

2. A method as recited in claim 1 further comprising the step of separating the cooked food patties from the belts of said first and second conveyors after the food patties have been conveyed past said second burner.

3. A method of broiling food patties, wherein a first group of food patties are to be thoroughly cooked and a second group of food patties are to be less-thoroughly cooked, comprising the steps of:
    loading the first group food patties on a first conveyor and conveying the first group food patties above and past a first burner to cook one side of the first group food patties, wherein said first conveyor includes an endless metal-link belt disposed between two rotating pulleys;
    flipping the partially cooked first group food patties over and transferring the partially cooked first group food patties to a second conveyor disposed below said first conveyor, wherein said second conveyor includes an endless metal-link belt disposed between two rotating pulleys, and wherein said partially cooked first group food patties are flipped over and transferred to said second conveyor as said belt of said first conveyor rounds the pulley at the end of said first conveyor;
    loading the second group food patties onto said second conveyor at a location upstream from the end of said first conveyor;
    confining both groups of food patties between a lower run of said first conveyor and an upper run of said second conveyor, wherein the belts of said first and second conveyors are driven at the same linear speed in opposite rotational directions; and
    conveying both groups of food patties past a second burner located immediately below the upper run of said second conveyor and past said first burner located immediately above the lower run of said first conveyor to cook the other side of the first group of food patties and partially cook the second group of food patties.

* * * * *